Aug. 21, 1956  J. F. KUZMICK ET AL  2,759,808
PROCESS OF PRODUCTION OF IRON POWDER
Filed Dec. 10, 1952

INVENTORS
Jerome F. Kuzmick
Warne P. Schenck
BY
ATTORNEYS.

United States Patent Office 2,759,808
Patented Aug. 21, 1956

2,759,808

PROCESS OF PRODUCTION OF IRON POWDER

Jerome F. Kuzmick, Orange, and Warne P. Schenck, Ledgewood, N. J., assignors to Alan Wood Steel Company, Conshohocken, Pa., a corporation of Pennsylvania Application December 10, 1952, Serial No. 325,104

3 Claims. (Cl. 75—.5)

The present invention relates to the production of powdered iron.

A purpose of the invention is to reduce powdered iron in briquette form under conditions which render the briquette readily friable so that it will easily disintegrate.

A further purpose is to cut down on the time and expense of reduction of iron oxide to powdered iron.

A further purpose is to mix iron oxide with ash-free coke in proportions less than the theoretical and reduce the iron oxide in the form of a readily permeable briquette by the concomitant action of a reducing gas surrounding the briquette, and the coke mixed in the briquette.

A further purpose is to form a briquette having a cross sectional wall thickness not in excess of 2 inches and preferably not in excess of 1 inch, having between 10 and 50% of voids by volume and preferably between 25 and 50% of voids by volume, to mix less than the theoretical amount of ash-free coke in the briquette and reduce the iron oxide by a reducing gas permeating the briquette and the coke.

A further purpose is to employ a reducing gas initially composed of at least 25% of hydrogen by volume, preferably more than 40% by volume, permissibly carbon monoxide up to a quantity equal to the hydrogen, and balance inert gas.

A further purpose is to interrelate the quantity of coke used with the reduction temperature and time and thereby counteract the greater tendency for reduction by the gas at the higher temperatures, thus obtaining a powdered iron having less than 0.15% of carbon by weight in the final product.

A further purpose is to increase the quantity of coke by from 5 to 10% by weight of the quantity otherwise determined in case the hydrogen content of the reducing gas is between 25 and 40% by volume.

A further purpose is to reduce at a temperature of 1950 to 2050° F. for a time of between 20 minutes and 5 hours and preferably between 20 minutes and 3 hours so as to leave the reduced briquette as friable as possible.

A further purpose is to produce a powdered iron which reliably has a carbon content of less than 0.15% and preferably less than 0.10%.

A further purpose is to employ a briquette in which the penetration of gas to the interior will be readily accomplished, limiting the cross sectional wall thickness of the briquette to 2 inches and preferably to less than 1 inch, and desirably also employing a void space in the original briquette between 10 and 50% and preferably between 25 and 50% by volume.

A further purpose is to expose substantially the entire outer surface of the briquette to the reducing gas.

A further purpose is to preheat a briquette of iron oxide and coke to a temperature of at least 1000° F. in air, thereby lowering the carbon content near the surface to compensate for the more effective gas reduction near the surface.

A further purpose is to obtain a briquette before reduction having a specific gravity of 3.0 to 3.3, and a briquette after reduction having a specific gravity of less than 2.4.

A further purpose is to incorporate copper oxide in a quantity not in excess of 0.4% calculated as copper by weight, based on the total of iron plus copper, and to reduce the copper oxide to metallic copper while it is distributed throughout the iron.

A further purpose is to increase the strength and ductility of the iron when formed as a powdered metal compact by mixing the copper oxide with the iron before the reduction of the iron, and reducing at a temperature above the melting point of copper, the copper forming in solid solution in the iron which will strengthen and improve the ductility of the final powdered metal compact formed from the iron powder without appreciable increase in the hardness or difficulty in grinding of the briquette.

A further purpose is to burn off between 0.10 and 0.15% carbon based on the iron content of the briquette during the preheating in air.

Further purposes appear in the specification and in the claims.

The drawings are illustrative of the process.

Figure 1:
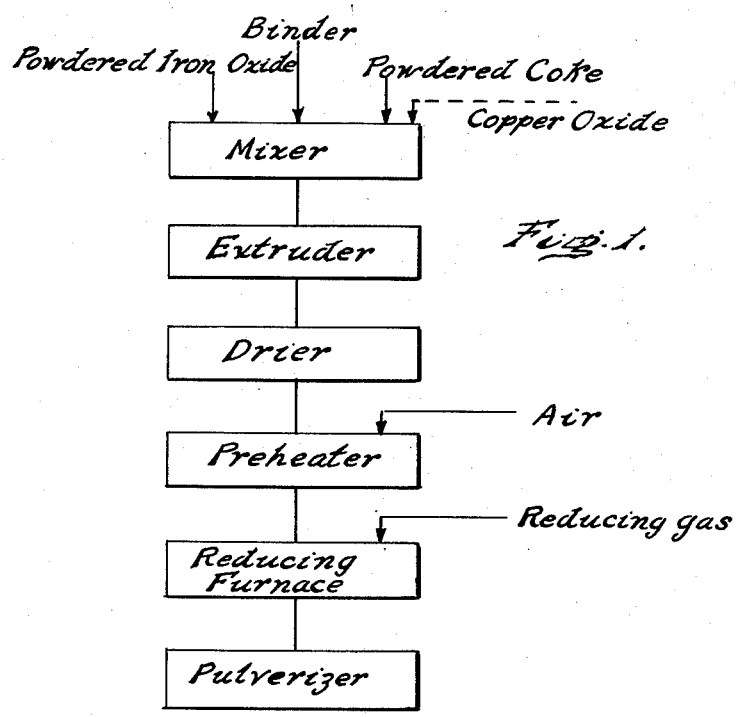
Figure 1 is a block diagram showing the preferred sequence of operations in accordance with the invention.

Powdered iron is extensively used to make powder metal compacts, which are formed under pressure and then sintered at an elevated temperature at which the powder particles bond. Wide use has been made of powdered iron compacts for gears, cams, bearings, and numerous other machine parts.

Considerable difficulty has been encountered in the production of powdered iron by commercial high production methods due to the following difficulties:

1. Where the powdered iron is reduced to the form of a briquette or other compact, using prior art techniques, it is difficult or impossible to disintegrate using commercial methods of grinding. This has led to extensive use of techniques in which the ore or other raw material is reduced in loose form, with corresponding difficulty in handling and in obtaining adequate and rapid contact between the reduction medium and the ore.

2. As it is desirable that most powdered iron used for molding compacts be soft and compressible, the reduction should not leave any appreciable residual carbon in the iron particles. Normal reduction of ores with solid reducing agents is accomplished in the presence of an excess of the reducing agent to aid the reaction by mass action. However, if this procedure is adopted in reducing iron for powdered iron, an excess of solid reducing agent will be present and will be difficult or impossible to remove. This has led to efforts to accomplish the reduction wholly by the use of gaseous reducing agents which will not leave any carbon residue. This procedure however has led to greatly slowing down the process and danger of production of incompletely reduced material, since gas contact with particles at the interior of the mass has often been unreliable.

Accordingly where high quality powdered iron is desired, free from any unreduced oxide and free from excess of carbon, resort has been had to comparatively expensive procedures such as the reduction of very thin layers in pure hydrogen gas.

The present invention is concerned with the production of powdered iron which is of high quality both by virtue of complete reduction of oxide, freedom from objectionable impurities, freedom from excess of carbon, low cost and by reliable high production methods, resulting in a quality product at much lower cost.

In accordance with the invention, the reduction is accomplished by a combination of solid carbon and gaseous reduction, the carbon being used however in a quantity which is less than that required to accomplish the reduction, and the quantity of carbon being interrelated with the reduction temperature and time and desirably also the gas composition so that when the reduction is accomplished under conditions in which the reducing gas is more effective, less carbon is present, and vice versa.

At the same time in accordance with the invention the solid reducing agent and the iron oxide are briquetted, but the form and structure of the briquette and the reduction procedure are such that in the preferred embodiment the reduced briquette of iron will be highly friable, so that it will break down into particles under crushing or grinding techniques, and not create a grinding problem.

By use of ash-free coke as a reducing agent, the increase in ash content is avoided.

By limiting the time of reduction to from 20 minutes to 5 hours, substantial sintering of iron particles which would tend to interfere seriously with the disintegrating of the briquette is prevented.

In order to compensate for the greater effectiveness of the gaseous reducing agent near the surface, the preheating to at least 1000° F., is preferably carried out in air, thus oxidizing carbon near the surface, removing preferably between 0.10 and 0.15% of carbon based on the iron content of the briquette, and thus avoiding the possibility that excess carbon would remain near the surface. Ordinarily the temperature of preheating need not exceed 1500° F.

It has also been found that the co-reduction of iron and of copper oxide present in a quantity not in excess of 0.4% calculated as copper by weight of the total of iron plus copper, produces an unexpected assistance in pressing the final compact at a low cost, reducing the pressures which are needed. Where the copper oxide is mixed with the iron oxide before reduction of the iron oxide and the two are reduced together at a temperature above the melting point of copper, this minute amount of copper apparently in solid solution in the iron markedly increases the tensile strength and the ductility of the final metal compact.

Considering now the procedure of the present invention in more detail, the source of iron oxide will be material consisting substantially entirely of iron oxide, examples being magnetite, hemitite, industrial iron oxide wastes and mill scale.

The iron oxide raw material chosen is of course substantially free from impurities which would be objectionable, particularly sulphur, phosphorus and substantial quantities of silica, since the silica contents in the final powdered iron ordinarily should not exceed 0.30%.

The iron oxide material will of course in some cases be present as $Fe_3O_4$, and in other cases as $Fe_2O_3$ or $FeO$. The iron oxide will preferably be pulverized to a size below 100 mesh per linear inch. The mesh referred to herein are Tyler standard mesh per linear inch.

The source of carbon is provided by ash-free coke, which should have an ash content not exceeding 0.5% by weight. Ordinary coal coke as used in the iron blast furnace is objectionable because of its high silica content. The coke used should also have a low volatile content, as high volatile content will cause local explosions of briquettes during reduction. The volatile content of the coke should not exceed 5% by weight.

Good results are obtained using calcined petroleum coke, although gas blocks are also suitable.

The coke used is normally heated for one hour in a retort at a temperature above 1500° F. to burn off volatiles before mixing it with the iron oxide.

The coke should be reduced to a size below 100 mesh before mixing with the iron oxide.

The other ingredient which is normally used in making the briquettes is a binder, which merely performs the function of holding the particles together. Wheat starch, potato starch, or corn starch or tapioca may be used as a suitable binder, the quantity of solid powdered binder being between ¼ and 1% and preferably about ½% on the weight of the iron oxide plus coke. The powdered binder is added to the moist iron oxide and coke mixture. The amount of water in the moist mixture is preferably in the range between 10% and 15% on the weight of the iron oxide plus coke where the mix is to be extruded.

The quantity of coke employed is in any case substantially less than the theoretical determined by the reduction of the iron oxide to carbon dioxide thus $$Fe_3O_4 + 2C \rightleftharpoons 2CO_2 + 3Fe$$
$$2Fe_2O_3 + 3C \rightleftharpoons 3CO_2 + 4Fe$$
$$2FeO + C \rightleftharpoons CO_2 + 2Fe$$

The quantity of coke related to the time and temperature of reduction in terms of the appropriate theoretical quantity according to the above reaction (the particular reaction will depend upon which iron oxide is being reduced) is as follows:

| Temperature of Reduction, ° F. | Time | Percent of Theoretical Weight of ash-free Coke for Reduction to Carbon Dioxide |
|---|---|---|
| 1,950 | 45 min. to 5 hrs | 65 to 70. |
| 2,000 | 30 min. to 4½ hrs | 76 to 81. |
| 2,050 | 20 min. to 4 hrs | 88 to 93. |

When operating at 1985° F. the minimum time is 35 minutes.

The reason for the smaller carbon content used at lower temperature is that at lower temperature longer time is required and with longer time at lower temperature more gas penetrates and therefore more reduction is accomplished by the gas.

For best results a temperature in excess of 2050° F. will not be used. Although less desirably a temperature up to but not as high as the melting point of the iron may be employed, using the proportion of the theoretical requirement of ash-free coke which is given in the table for 2050° F.

The control of the amount of carbon is important, as we find that if the theoretical carbon content is used or any excess thereof, the resulting powdered iron is grossly excessive in carbon content (over 1% carbon by weight is likely to be encountered).

For best results the carbon content is also controlled by the composition of the reducing gas, to the extent that where the hydrogen content of the gas is between 25 and 40% by volume, the carbon content is increased by between .5 and 10 percent of the carbon content given by the table above, since this less active gas reduces more slowly and more of the actual reduction must be accomplished by the carbon.

After the carbon content is determined and the appropriate amount weighed out, the iron oxide, powdered coke and binder are mixed together as indicated in Figure 1 and the mixture is formed into briquettes, preferably by an auger type extruder or auger machine. It is important that the pressures applied be moderate, as high density of the briquettes is undesirable, it being decidedly preferable to have large void space. The void space in the dried briquette will be between 10 and 50 percent by volume, and preferably between 25 and 50 percent and most desirably 30 to 40 percent by volume. Thus the briquette has an apparent specific gravity before reduction of 3.0 to 3.3 in the preferred embodiment, and after reduction the apparent specific gravity is not in excess of 2.4 in the preferred embodiment.

Figure 3:
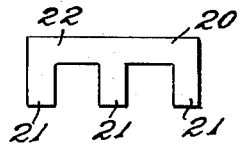
Figure 3 is a forward end elevation of a briquette in accordance with the invenion.
Figure 5:
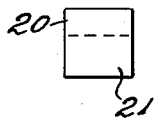
Figure 5 is an end elevation of a briquette of Figures 3 and 4.
Figure 4:
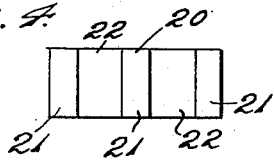
Figure 4 is a top plan view of the briquette of Figure 3.

In addition it is important that the cross section of the briquette should not exceed 2 inches and preferably not exceed one inch. By this it is meant that no portion of the cross section is thicker than two inches. Figures 3 to 5 illustrate a briquette 20 made by extruding a cross section as shown in Figure 3 and cutting off in the plane of the paper at suitable intervals. Each of the prongs 21 of the section and the base 22 has a thickness less than 2 inches and preferably not in excess of 1 inch, so that the distance of required gas travel to the inside is limited, and this, combined with the high permeability of the briquette, assures that the gas can contact the innermost particles.

Anomalously, this permeable briquette using a limited section thickness and preferably a hollow or recessed tile formation as shown much more readily maintains contact with the gas than a loose mass of particles. This is believed to be due partly to the fact that access to substantially the entire outside surface of the briquette by the gas is readily maintained. In any case, more than 90% of the briquette surface is exposed to the gas.

After the briquette is extruded and cut off or otherwise formed, it is then dried. The briquette is then preheated.

Preheating is preferably accomplished in air up to a temperature of at least 1000° F. This has been found to be beneficial since it slightly decarburizes the surface, removing in most cases from 0.10 to 0.15 percent by weight of carbon based on the iron content of the briquette, and as a result it counteracts the tendency of the outer surface of the briquette to retain excess carbon due to the fact that a larger amount of the reduction is accomplished by gas than by solid carbon at that location. This procedure removes from 1 to 1.5% by weight of the total carbon in usual practice.

The preheated briquette is then passed into a reducing gas atmosphere, and preferably through a continuous muffle type furnace 23 (Figure 6) suitably heated by electric resistors 24, or gas radiant tube heaters, and carrying the briquettes 20 on thin supporting rails 25 to expose the bottom as well as the top and sides of the briquettes to the gas. The rails may suitably be moved on a moving hearth or conveyor 26, or, as well known, the briquettes can be progressed by a pusher mechanism.

The character of the reducing gas will vary in different applications. Hydrogen is preferable, and hydrogen with nitrogen as an impurity, such as dissociated ammonia, is very satisfactory.

In any case the hydrogen content of the gas should not be less than 25 percent by volume. Endo gas is suitable, in which case the composition will eb about 40 percent hydrogen, 20 percent carbon monoxide and the balance nitrogen by volume.

The percentage of carbon monoxide should not exceed the percentage of hydrogen by volume.

Excessive quantities of water vapor in the incoming reducing gas are also objectionable although of course water vapor will be present in the effluent gas due to the reduction. The quantity of water vapor in the incoming gas should not exceed 1 percent by volume, and preferably should not exceed ½ percent.

In addition to hydrogen and carbon monoxide, the entering reducing gas will contain a balance made up of inert gases, chiefly nitrogen, with minute amounts of the rare inert gases in the atmosphere in some cases. Appreciable amounts of carbon dioxide will not be present in the entering gas, although the exit gas will contain carbon dioxide produced by the reduction. The gas will desirably be preheated to furnace temperature, although this is not essential.

The rate of gas flow will vary with the particular installation, gas flows of 140 cubic feet per hour for example having been used with good results in a small installation, and it being evident that the gas flow must be adequate to remove objectionable build-up of carbon dioxide and water vapor around the briquettes and maintain a strongly reducing atmosphere which will favor the reaction, and not reoxidize the iron.

The briquettes during reduction should, of course, not be exposed to fuel combustion, as this is likely to result in contamination with carbon dioxide or excess air. Thus any direct contact with fuel combustion gases must be avoided.

The time of exposure during the reduction should be at least 20 minutes but it is preferable not to use excessively long exposures as it is desired to maintain the briquette in a friable form. Accordingly the time of reduction will usually not exceed 5 hours and preferably not exceed 3 hours.

The reduced briquettes are allowed to cool to a temperature below 250° in a protecting atmosphere, preferably the atmosphere of reduction. This is readily accomplished by providing a cooling chamber or vestible at the forward end of the tunnel reducing furnace 23 which cools the briquettes down to the low temperature.

After the briquettes have been cooled, they are pulverized into powder below 60 mesh and preferably below 100 mesh. One of the very important features of the invention is the ease with which the briquettes disintegrate under ordinary crushing and grinding techniques, without requiring expensive and prolonged grinding. It will be understood of course that due to the softness of pure iron, if the briquette particles are allowed to sinter thoroughly, the problem of disintegrating is greatly increased.

The resultant product is a powdered iron having a carbon content less than 0.15 percent and preferably less than 0.10 percent, with a low content of silicon, and, where raw material sources are properly chosen, sulphur and phosphorous within safe limits.

Figure 6:
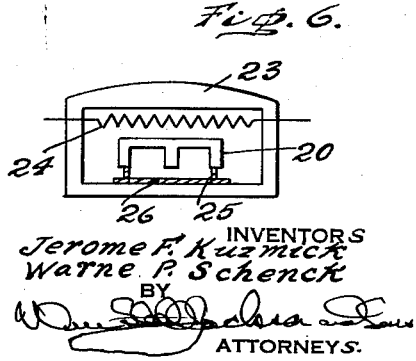
Figure 6 is a diagrammatic front end elevation showing the reduction furnace used in the invention, omitting the doors, and sectioning the conveyor.

In this process conjoint reduction by solid carbon in intimate admixture with iron oxide and by surrounding hydrogen containing reducing gas is accomplished. The limited cross sectional thickness of the briquette and the high void space assure good penetration of the gas, while on the other hand the contact between particles assures a minimum diffusion path for carbon to accomplish the reduction, along with high heat conductivity to heat up the interior of the briquette quickly. The briquettes are supported in such a way as shown in Figure 6 (or by use of perforated or screen trays or baskets as well known) that gas contact substantially all around the briquettes is readily obtained.

The reduced briquette has an apparent specific gravity less than 2.4 and is so friable that it crumbles under crushing and grinding. Thus the grinding of the initial iron oxide is the one difficult grinding required, and this has the advantage that the iron oxide fractures readily, whereas the iron particles being highly ductile tend to smear rather than to fracture in grinding where they are intimately united.

The resultant iron powder under the hydrogen loss test shows a loss of less than 1 percent, showing that very complete reduction has taken place.

The resultant iron powder will have less than 0.15% of carbon by weight, although of course a high carbon iron compact can be obtained from this by adding carbon to the iron powder or by carburizing the compact.

Where the iron powder is put through a muller in the final grinding or pounding, and considerable cold work is done on the particles, it is often desirable to anneal. Any suitable annealing technique will be used, for example exposing the particles at a temperature of 950 to 1350° F., preferably about 1300, in a suitable gaseous atmosphere, which may in this case be endo gas containing about 40 percent hydrogen, 20 percent carbon monoxide and the balance nitrogen by volume, or exo gas containing zero to 18 percent hydrogen, 0 to 12 percent carbon monoxide, 5 to 12 percent carbon dioxide, trace to 2.5 percent water vapor and balance nitrogen by volume.

It has been found that the ultimate forming of the iron powder into the powder metal compact can be carried out more effectively at moderate pressures if a small amount of copper is present by reason of reduction of copper oxide in the presence of the iron.

The presence of reduced copper oxide to the extent of from .05 to 0.40 per cent calculated as copper on the weight of iron plus copper substantially increases the tensile strength of the powder metal compact when the copper oxide is reduced in the presence of the iron, the increase being 25 percent if the copper content thus obtained is close to 0.40 percent. The copper may be present, initially, as cuprous or cupric oxide, preferably below 100 mesh.

Figure 2:
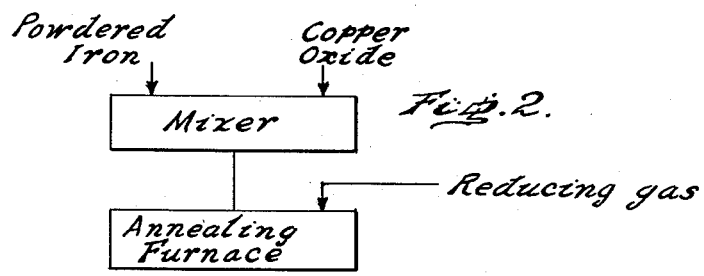
Figure 2 is a block diagram showing supplemental procedure which may be used.

The presence of the copper in the briquette as originally reduced slightly increases the difficulty in crushing and grinding the reduced briquette, and therefore from the standpoint of cheapness of the final disintegrating it is best to introduce the copper oxide in a mixer as shown in Figure 2 before the iron powder goes to the annealing furnace and reduce the copper oxide in the annealing furnace. In this case the gas may be as specified for reduction of iron oxide or it may be exogas containing in excess of 10 percent of hydrogen by volume.

It has been found, however, that where the copper oxide in the quantity mentioned is introduced prior to the reduction of the iron and the copper oxide and the iron oxide are reduced together as shown in Figure 1 at a temperature above the melting point of copper, not only is the increase in tensile strength obtained, but the powdered metal compact after annealing has an elongation of about 5 to 7 percent, rather than about 3 to 4 percent when the copper oxide is introduced immediately before the annealing as in Figure 2. Thus where this increased elongation is desirable the copper oxide is introduced before the iron oxide reduction.

The copper content of 0.40 percent is less than the solid solubility of copper in iron at the reduction temperature and also at room temperature, so that in effect copper-iron solid solution is obtained by diffusion which will not give great hardening of the briquette, and thus will not greatly interfere with breaking down the briquette or molding of the powder, but an appreciable increase in strength of the powder metal compact is obtained.

In view of our invention and disclosure variations and modifications to meet individual whim or particular need will doubtless become evident to others skilled in the art, to obtain all or part of the benefits of our invention without copying the process shown, and we, therefore, claim all such insofar as they fall within the reasonable spirit and scope of our claims.

Having thus described our invention, what we claim as new and desire to secure by Letters Patent is:

1. The process of producing powdered iron from a material consisting substantially of iron oxide, which comprises pulverizing the iron oxide material to finely divided form, mixing the iron oxide material with ash-free coke and a binder, the quantity of ash-free coke related to the temperature and time of reduction being as follows:

| Temperature of Reduction, ° F. | Time | Percent of Theoretical Weight of ash-free Coke for Reduction to Carbon Dioxide |
|---|---|---|
| 1,950 | 45 min. to 5 hrs | 65 to 70. |
| 2,000 | 30 min. to 4.5 hrs | 76 to 81. |
| 2,050 | 20 min. to 4 hrs | 88 to 93. | the quantity of coke being increased by between 5 and 10 percent of the quantity above mentioned where the hydrogen content of the reducing gas mentioned below is between 25 and 40 percent by volume, forming the mixture into briquettes having a cross sectional thickness less than 2 inches and having from 25 to 50 percent of voids by volume, heating the briquettes to a temperature in the range of 1950 to 2050 degrees F. for a time as specified above in a reducing atmosphere initially consisting of at least 25% hydrogen by volume, permissibly carbon monoxide up to but not exceeding the quantity of hydrogen and balance inert gas, initially reducing the iron oxide by concurrent action of the coke and the reducing atmosphere and completing the reduction entirely by the reducing atmosphere, cooling the briquettes in a protective atmosphere to a temperature below 250° F. and pulverizing the briquettes into powder, whereby the presence of the carbon reduces the time of reduction, assures reduction at the interior and retards sintering of particles, the limitation of carbon below the theoretical assures a low carbon product and assures a product which can be readily disintegrated, and the reducing atmosphere completes the reduction under noncarburizing conditions.

2. The process of claim 1, in which the reducing atmosphere contains water vapor not exceeding 1%.

3. The process of claim 1, which comprises preheating the briquettes before they are reduced, in air at a temperature of at least 1000° F., thereby burning off carbon near the surface to an extent of 0.10 to 0.15 percent by weight of the iron present.

References Cited in the file of this patent

UNITED STATES PATENTS

| 1,864,593 | Gustafsson | June 28, 1932 |
| 2,413,492 | Firth | Dec. 31, 1946 |

OTHER REFERENCES

Alloys of Iron and Copper, page 168. Edited by Gregg et al. Published in 1934 by the McGraw-Hill Book Co., New York.